United States Patent
Bryant et al.

(10) Patent No.: US 12,092,549 B2
(45) Date of Patent: Sep. 17, 2024

(54) DEVICE AND METHOD OF MANUFACTURING A DEVICE FOR DETECTING HYDROCARBONS

(71) Applicant: UTI Limited Partnership, Calgary (CA)

(72) Inventors: Steven Bryant, Calgary (CA); Bri (Holly) Sebastian, Calgary (CA); Roberto J. Pilonieta, Calgary (CA); Viola Birss, Calgary (CA); Robert Mayall, Calgary (CA)

(73) Assignee: UTI LIMITED PARTNERSHIP, Calgary (CA)

( * ) Notice: Subject to any disclaimer, the term of this patent is extended or adjusted under 35 U.S.C. 154(b) by 780 days.

(21) Appl. No.: 16/491,352

(22) PCT Filed: Mar. 6, 2018

(86) PCT No.: PCT/IB2018/051447
§ 371 (c)(1),
(2) Date: Sep. 5, 2019

(87) PCT Pub. No.: WO2018/163071
PCT Pub. Date: Sep. 13, 2018

(65) Prior Publication Data
US 2020/0033222 A1    Jan. 30, 2020

Related U.S. Application Data

(60) Provisional application No. 62/468,358, filed on Mar. 6, 2017.

(51) Int. Cl.
*G01M 3/04* (2006.01)
*B01D 17/02* (2006.01)
(Continued)

(52) U.S. Cl.
CPC ............ *G01M 3/045* (2013.01); *B01D 17/02* (2013.01); *C02F 1/48* (2013.01); *C08J 3/11* (2013.01);
(Continued)

(58) Field of Classification Search
CPC ........ B01D 17/02; C02F 1/48; C02F 2101/32; C02F 2305/08; C08J 3/11; C08J 3/212;
(Continued)

(56) References Cited

U.S. PATENT DOCUMENTS 4,594,638 A    6/1986 Suzuki et al.
4,961,064 A    10/1990 Hara
(Continued)

FOREIGN PATENT DOCUMENTS

CN         101531767 A  *  9/2009

OTHER PUBLICATIONS

Boker, A., Lin, Y., Chiapperini, K., Horowitz, R., Thompson, M., Carreon, V., Xu, T., Abetz, C., Skaff, H., Dinsmore, A.D., Emrick, T., Russell, T.P., "Hierarchical nanoparticle assemblies formed by decorating breath figures", Nature Materials, 2004, 3, 302-306 (Year: 2004).*
(Continued)

*Primary Examiner* — James C Goloboy
(74) *Attorney, Agent, or Firm* — Perry + Currier Inc.

(57) ABSTRACT

An example a method of manufacturing a film is provided. The method involves dissolving a backbone material in a non-aqueous solvent to form a non-aqueous solution. The method further involves adding the non-aqueous solution to an aqueous solution to form a liquid-liquid interface and injecting a particulate proximate to the liquid-liquid interface the non-aqueous solution is then evaporated to form a film containing the particulate. The film may be used in devices such as sensor devices for detecting hydrocarbons.

15 Claims, 14 Drawing Sheets

(51) Int. Cl.

| | |
|---|---|
| *C02F 1/48* | (2023.01) |
| *C02F 101/32* | (2006.01) |
| *C08J 3/11* | (2006.01) |
| *C08J 3/21* | (2006.01) |
| *C08J 5/18* | (2006.01) |
| *G01M 3/18* | (2006.01) |

(52) U.S. Cl.
CPC ............... *C08J 3/212* (2013.01); *C08J 5/18* (2013.01); *G01M 3/18* (2013.01); *C02F 2101/32* (2013.01); *C02F 2305/08* (2013.01); *C08J 2323/06* (2013.01); *C08J 2323/12* (2013.01); *C08J 2325/06* (2013.01); *C08J 2327/18* (2013.01); *C08J 2391/06* (2013.01)

(58) Field of Classification Search
CPC ...... C08J 5/18; C08J 2323/06; C08J 2323/12; C08J 2325/06; C08J 2327/18; C08J 2391/06; G01M 3/045; G01M 3/18
See application file for complete search history.

(56) References Cited

U.S. PATENT DOCUMENTS

| | | | |
|---|---|---|---|
| 5,498,372 A | 3/1996 | Hedges | |
| 10,071,919 B2 | 9/2018 | Lead | |
| 2005/0088485 A1* | 4/2005 | Tamahashi | B41J 2/1433 347/45 |
| 2006/0249384 A1 | 11/2006 | Kim et al. | |
| 2016/0238547 A1 | 8/2016 | Park et al. | |

OTHER PUBLICATIONS

Boker, A., Lin, Y., Chiapperini, K., Horowitz, R., Thompson, M., Carreon, C., Xu, T., Abetz, C., Skaff, H., Dinsmore, A.D., Emrick, T., Russell, T.P., "Hierarchical nanoparticle assemblies formed by decorating breath figures", Nature Materials, 2004, 3, 302-305 (Year: 2004).*

Böker, Alexander, et al. "Hierarchical nanoparticle assemblies formed by decorating breath figures." Nature Materials 3.5 (2004): 302.

ISA/CA, International Search Report and Written Opinion, May 28, 2018, re PCT International Patent Application No. PCT/IB2018/051447.

Li, Yong-Jun, Wei-Jun Huang, and Shi-Gang Sun. "A Universal Approach for the Self-Assembly of Hydrophilic Nanoparticles into Ordered Monolayer Films at a Toluene/Water Interface." Angewandte Chemie International Edition 45.16 (2006): 2537-2539.

Xin, Jing, et al. "Formation of graphene oxide films at the liquid/liquid interface." Composite Interfaces 21.7 (2014): 623-630. [Abstract Only].

Lin, Y., et al. "Nanoparticle assembly and transport at liquid-liquid interfaces." Science 299.5604 (2003): 226-229.

Kraus, Tobias, et al. "Nanoparticle printing with single-particle resolution." Nature nanotechnology 2.9 (2007): 570-576.

Zywietz, Urs, et al. "Laser printing of silicon nanoparticles with resonant optical electric and magnetic responses." Nature communications 5.1 (2014): 1-7. 3402.

Zhu, Sheng-Qing, et al. "Gold nanoparticle thin films fabricated by electrophoretic deposition method for highly sensitive SERS application." Nanoscale research letters 7.1 (2012): 1-7.

Pavan, Mariela J., and Roy Shenhar. "Two-dimensional nanoparticle organization using block copolymer thin films as templates." Journal of Materials Chemistry 21.7 (2011): 2028-2040.

Scheid, D., et al. "The pivotal step of nanoparticle functionalization for the preparation of functional and magnetic hybrid opal films." Journal of Materials Chemistry C 4.11 (2016): 2187-2196.

Ben-Sasson, Moshe, et al. "Surface functionalization of thin-film composite membranes with copper nanoparticles for antimicrobial surface properties." Environmental science & technology 48.1 (2014): 384-393.

Binder, Wolfgang H. "Supramolecular assembly of nanoparticles at liquid-liquid interfaces." Angewandte Chemie International Edition 44.33 (2005): 5172-5175.

Mingeot-Leclercq, Marie-Paule, et al. "Atomic force microscopy of supported lipid bilayers." Nature protocols 3.10 (2008): 1654-1659.

Turina, Anahi V., Pedro D. Clop, and Maria A. Perillo. "Synaptosomal Membrane-Based Langmuir-Blodgett Films: A Platform for Studies on γ-Aminobutyric Acid Type A Receptor Binding Properties." Langmuir 31.5 (2015): 1792-1801.

Deák, A., et al. "Nanostructured silica Langmuir-Blodgett films with antireflective properties prepared on glass substrates." Thin Solid Films 484.1-2 (2005): 310-317.

Leontidis, Epameinondas. "Langmuir-Blodgett Films: Sensor and Biomedical Applications and Comparisons with the Layer-by-Layer Method." Surface Treatments for Biological, Chemical, and Physical Applications (2017): 181-208. [Abstract Only].

Kaur, Harneet, et al. "Large area fabrication of semiconducting phosphorene by langmuir-blodgett assembly." Scientific reports 6 (2016): 34095.

Zhang, Lianbin, et al. "A self-cleaning underwater superoleophobic mesh for oil-water separation." Scientific reports 3 (2013): 2326.

Nieminen, Joonas J., et al. "Hydrogen evolution catalyzed by electrodeposited nanoparticles at the liquid/liquid interface." Chemical Communications 47.19 (2011): 5548-5550.

Sanyal, Milan K., et al. "Formation and Ordering of Gold Nanoparticles at the Toluene-Water Interface." The Journal of Physical Chemistry C 112.6 (2008): 1739-1743.

Rao, C. N. R., et al. "Films of metal nanocrystals formed at aqueous-organic interfaces." The Journal of Physical Chemistry B 107.30 (2003): 7391-7395.

Gautam, Ujjal K., Moumita Ghosh, and C. N. R. Rao. "Template-free chemical route to ultrathin single-crystalline films of CuS and CuO employing the liquid-liquid Interface." Langmuir 20.25 (2004): 10775-10778. [Abstract Only].

Deki, Shigehito, et al. "Deposition of Metal Oxide Films at Liquid-Liquid Interface by the Liquid Phase Deposition Method." The Journal of Physical Chemistry C 112.35 (2008): 13535-13539.

D'Arcy, Julio M., et al. "Versatile solution for growing thin films of conducting polymers." Proceedings of the National Academy of Sciences 107.46 (2010): 19673-19678.

Pickup, Peter G., and V. I. Birss. "A model for anodic hydrous oxide growth at iridium." Journal of electroanalytical chemistry and interfacial electrochemistry 220.1 (1987): 83-100.

Hornback, J. M. "Organic Chemistry 2nd Ed." Thomson Brooks/Cole, USA (2006).

Augustynski, J., et al. "ESCA study of the state of iridium and oxygen in electrochemically and thermally formed iridium oxide films." Journal of electroanalytical chemistry and interfacial electrochemistry 160.1-2 (1984): 233-248.

Bailey, K. Bulletin 2016-22: Operational Advisory: Leak Detection. Alberta Energy Regulator. URL: http://www.aer.ca/rules-and-regulations/bulletins/bulletin-2016-22 (accessed Dec. 8, 2016).

Natural Resources Canada, "Pipeline Safety" Brochure, Minister of Natural Resources, Canada, Sep. 2014.

El-Shiekh, T. M. "Leak detection methods in transmission pipelines." Energy Sources, Part A: Recovery, Utilization, and Environmental Effects 32.8 (2010): 715-726.

Acikbas, Y., et al. "Organic vapor sensing properties of copolymer Langmuir-Blodgett thin film sensors." Journal of Macromolecular Science, Part A 53.8 (2016): 470-474.

Agrawal, Ved Varun, G. U. Kulkarni, and C. N. R. Rao. "Nature and properties of ultrathin Nanocrystalline gold films formed at the organic-aqueous Interface." The Journal of Physical Chemistry B 109.15 (2005): 7300-7305.

Aslan, Emre, Imren Hatay Patir, and Mustafa Ersoz. "Cu nanoparticles electrodeposited at liquid-liquid interfaces: a highly efficient catalyst for the hydrogen evolution reaction." Chemistry—A European Journal 21.12 (2015): 4585-4589.

Ahn, Taebin, et al. "Formation pathways of magnetite nanoparticles by coprecipitation method." The journal of physical chemistry C 116.10 (2012): 6069-6076. [Abstract and Supporting Information Only].

(56) References Cited

OTHER PUBLICATIONS

Gardner, T. J., and L. I. McLaughlin. "Ion exchange properties of novel hydrous metal oxide materials." MRS Online Proceedings Library Archive 432 (1996).
Banham, Dustin, et al. "Novel mesoporous carbon supports for PEMFC catalysts." Catalysts 5.3 (2015): 1046-1067.
Li, Zuojiang, and Mietek Jaroniec. "Colloidal imprinting: a novel approach to the synthesis of mesoporous carbons." Journal of the American Chemical Society 123.37 (2001): 9208-9209.
Huang, Chien-Lin, et al. "Polypropylene/graphene and polypropylene/carbon fiber conductive composites: mechanical, crystallization and electromagnetic properties." Applied Sciences 5.4 (2015): 1196-1210.
Resch-Genger, Ute, et al. "Quantum dots versus organic dyes as fluorescent labels." Nature methods 5.9 (2008): 763.
Peng, Xinsheng, et al. "Flexible ultrathin free-standing fluorescent films of CdSe x S 1-x/ZnS nanocrystalline and protein." Journal of Materials Chemistry 21.12 (2011): 4424-4431.
Cao, Xiaodong, et al. "Fabrication of strongly fluorescent quantum dot-polymer composite in aqueous solution." Chemistry of materials 19.15 (2007): 3773-3779.
Zhang, Hao, et al. "From Water-Soluble CdTe Nanocrystals to Fluorescent Nanocrystal-Polymer Transparent Composites Using Polymerizable Surfactants." Advanced Materials 15.10 (2003): 777-780.
Gao, Mingyuan, et al. "Lateral patterning of CdTe nanocrystal films by the electric field directed layer-by-layer assembly method." Langmuir 18.10 (2002): 4098-4102.
Estelrich, Joan, et al. "Iron oxide nanoparticles for magnetically-guided and magnetically-responsive drug delivery." International journal of molecular sciences 16.4 (2015): 8070-8101.
Huang, Jing, et al. "Magnetic nanoparticle facilitated drug delivery for cancer therapy with targeted and image-guided approaches." Advanced functional materials 26.22 (2016): 3818-3836.
Mody, Vicky V., et al. "Magnetic nanoparticle drug delivery systems for targeting tumor." Applied Nanoscience 4.4 (2014): 385-392.
Mirshahghassemi, Seyyedali, and Jamie R. Lead. "Oil recovery from water under environmentally relevant conditions using magnetic nanoparticles." Environmental science & technology 49.19 (2015): 11729-11736.
Atta, Ayman M., Hamad A. Al-Lohedan, and Sami A. Al-Hussain. "Functionalization of magnetite nanoparticles as oil spill collector." International journal of molecular sciences 16.4 (2015): 6911-6931.
Juodkazyté, Jurga, et al. "Iridium anodic oxidation to Ir (III) and Ir (IV) hydrous oxides." Electroanalysis: An International Journal Devoted to Fundamental and Practical Aspects of Electroanalysis 17.11 (2005): 947-952.
Freund, R et al., Eds., Ill. Applications of Paraffin Waxes and Liquid Paraffins. In Developments in Petroleum Science. Elsevier: 1982; vol. 14, pp. 240-329.
Pu, G .; Wang, J .; Severtson, S. J., Properties of paraffin wax/montmorillonite nanocomposite coatings, 2007 NSTI Nanotechnology Conference and Trade Show—NSTI Nanotech 2007, Technical Proceedings, 2007; pp. 112-115.
Románszki, Loránd, et al. "Polystyrene films as barrier layers for corrosion protection of copper and copper alloys." Bioelectrochemistry 97 (2014): 7-14.
Pilapil, Brandy K., et al. "Self-assembly of nanoparticles onto the surfaces of polystyrene spheres with a tunable composition and loading." Nanotechnology 26.5 (2015): 055601.
Wang, Chia-Wei, et al. "Functionalized polymer spheres via one-step photoinduced synthesis for antimicrobial activity and gene delivery." Nanotechnology 23.25 (2012): 255103. [Abstract Only].
Scheerlinck, Jean-Pierre Y., et al. "Systemic immune responses in sheep, induced by a novel nano-bead adjuvant." Vaccine 24.8 (2006): 1124-1131.
Silvestre, Clara, et al. "Development of antibacterial composite films based on isotactic polypropylene and coated ZnO particles for active food packaging." Coatings 6.1 (2016): 4.
Atayev, Parahat, and Mualla Oner. "Effect of incorporation of clay and zinc oxide nanoparticles on oxygen barrier properties of polypropylene sheet." Journal of Plastic Film & Sheeting 30.3 (2014): 248-265.
Erdem, Nilufer, Aysun A. Cireli, and Umit H. Erdogan. "Flame retardancy behaviors and structural properties of polypropylene/nano-SiO2 composite textile filaments." Journal of applied polymer science 111.4 (2009): 2085-2091.
Lee, Jong-Min, et al. "Effects of PVP on the formation of silver-polystyrene heterogeneous nanocomposite particles in novel preparation route involving polyol process: Molecular weight and concentration of PVP." Materials Chemistry and Physics 114.2-3 (2009): 549-555.
Zhang, Jiahao, et al. "Synthesis of magnetic iron oxide nanoparticles onto fluorinated carbon fabrics for contaminant removal and oil-water separation." Separation and Purification Technology 174 (2017): 312-319.
Azad, Ibrahim, et al. "Fabrication and characterization of ZnO Langmuir-Blodgett film and its use in metal-insulator-metal tunnel diode." Langmuir 32.33 (2016): 8307-8314.
Binks, B. P., and P. D. I. Fletcher. "Particles adsorbed at the oil-water interface: A theoretical comparison between spheres of uniform wettability and "Janus" particles." Langmuir 17.16 (2001): 4708-4710.
Burke, L. D., and D. P. Whelan. "A new interpretation of the charge storage and electrical conductivity behaviour of hydrous iridium oxide." Journal of Electroanalytical Chemistry and Interfacial Electrochemistry 124.1-2 (1981): 333-337.
Campbell, H. B., H. Elzanowska, and V. I. Birss. "Towards a reliable and high sensitivity O2-independent glucose sensor based on Ir oxidenanoparticles." Biosensors and Bioelectronics 42 (2013): 563-569.
Gautam, Ujjal K., Moumita Ghosh, and C. N. R. Rao. "A strategy for the synthesis of nanocrystal films of metal chalcogenides and oxides by employing the liquid-liquid interface." Chemical physics letters 381.1-2 (2003): 1-6.
Gorbunova, Y., et al. "Langmuir-Blodgett films of bis (octakispropyloxy) samarium bisphthalocyanine. Spectroscopic and gas-sensing properties." Langmuir 17.16 (2001): 5004-5010.
Jhas, Amit S., et al. "Dual oxygen and Ir oxide regeneration of glucose oxidase in nanostructured thin film glucose sensors." Electrochimica acta 55.26 (2010): 7683-7689.
Schwartz, H., Y. Harel, and S. Efrima. "Surface behavior and buckling of silver interfacial colloid films." Langmuir 17.13 (2001): 3884-3892.
Tian, Jia, et al. "Amphiphilic gold nanoparticles formed at a liquid-liquid interface and fabrication of hybrid nanocapsules based on interfacial UV photodimerization." Polymer Chemistry 4.6 (2013): 1913-1920.
Trojánek, Antoni'n, Jan Langmaier, and Zdenek Samec. "Electrocatalysis of the oxygen reduction at a polarised interface between two immiscible electrolyte solutions by electrochemically generated Pt particles." Electrochemistry communications 8.3 (2006): 475-481.
Wu, Lei, et al. "Magnetic, durable, and superhydrophobic polyurethane@Fe3O4@ SiO2@Fluoropolymer sponges for selective oil absorption and oil/water separation." ACS applied materials & interfaces 7.8 (2015): 4936-4946.
Zheng, Qingbin, et al. "Transparent conductive films consisting of ultralarge graphene sheets produced by Langmuir-Blodgett assembly." ACS Nano 5.7 (2011): 6039-6051.
Krupa, Igor, et al. "Electrically conductive composites based on an elastomeric matrix filled with expanded graphite as a potential oil sensing material." Smart materials and structures 23.12 (2014): 125020.
Das, Rashmita, Rajib Bandyopadhyay, and Panchanan Pramanik. "Efficient detection of volatile aromatic hydrocarbon using linseed oil-styrene divinylbenzene copolymer coated quartz crystal microbalance." RSC Advances 5.73 (2015): 59533-59540.
Itahara, Toshio, Takahiro Tsuchida, and Mayumi Morimoto. "Solvent-driven swelling and shrinking of poly (NIPAM) gels crosslinked by tris-methacrylated phloroglucinol derivatives." Polymer Chemistry 1.7 (2010): 1062-1066.

(56) References Cited

OTHER PUBLICATIONS

Akyildiz, Ian F., and Erich P. Stuntebeck. "Wireless underground sensor networks: Research challenges." Ad Hoc Networks 4.6 (2006): 669-686.
Akyildiz, Ian F., et al. "Wireless sensor networks: a survey." Computer networks 38.4 (2002): 393-422.
Ritter, Steve. "Gasoline." Chemical & engineering news 83.8 (2005): p. 37.
Li, Xue-Mei, David Reinhoudt, and Mercedes Crego-Calama. "What do we need for a superhydrophobic surface? A review on the recent progress in the preparation of superhydrophobic surfaces." Chemical Society Reviews 36.8 (2007): 1350-1368.
Lavine, Barry K., et al. "New Approaches to Chemical Sensing-Sensors Based on Polymer Swelling." Analytical letters 39.9 (2006): 1773-1783.
Patankar, Neelesh A. "On the modeling of hydrophobic contact angles on rough surfaces." Langmuir 19.4 (2003): 1249-1253.
Yazdandoust, Fateme, and S. Shahaboddin Yasrobi. "Effect of cyclic wetting and drying on swelling behavior of polymer-stabilized expansive clays." Applied Clay Science 50.4 (2010): 461-468.

\* cited by examiner

DEVICE AND METHOD OF MANUFACTURING A DEVICE FOR DETECTING HYDROCARBONS

CROSS-REFERENCE TO RELATED APPLICATION

This application claims priority to of U.S. Patent Application No. 62/467,358 filed Mar. 6, 2017, the contents of which are incorporated herein by reference.

FIELD

The present specification relates generally to an apparatus, method, and reagent for detecting hydrocarbons, and more particularly to an organic solvent device for detecting hydrocarbons.

BACKGROUND

Pipelines can be used to transport oil and gas. Although pipelines are generally safe and reliable, the potential leaking of oil and gas into the environment does exist. For example, extreme weather, earthquakes, wildlife, material degradation, and sabotage can result in a leak where oil and gas enter the environment. When leaks occur, they can infiltrate water systems, kill wildlife and contaminate soil. In many instances, pipeline owners are unaware of small leaks. In some remote locations, once a leak is identified, it can take as long as 48 days to respond to and isolate a pipeline leak. For example, in Canada alone, there are an estimated 825,000 kilometers of pipeline infrastructure already in operation with the vast majority of the network in remote locations that are difficult to access. In addition, the majority of the network is buried underground where the depth of soil cover for pipelines varies, depending on where the pipeline is located. This creates significant challenges when monitoring pipelines for leaks. Identifying liquid leaks can be difficult, as liquids seep down into the ground.

Two general types of leak detection systems are commonly used: continuous and non-continuous. Non-continuous systems involve using dogs, smart pigging or aerial inspection. Continuous systems involve both external and internal methods. The external methods include acoustic emission, cable sensors, and liquid or vapor sensing, while internal methods typically include pressure wave detection, volume or mass balance, and other analytical methods. In both cases, sensors can be employed. A challenge of many detection methods is developing a cost-effective sensor that can be retroactively inserted close enough to the bottom of pre-existing pipelines, such that it can adequately detect leaks, without excavating the pipe.

Flexible "smart skin" sensors that are situated directly onto the exterior of a pipeline are known. This smart skin is comprised of conductive nanoparticles incorporated into a polymer which swells in the presence of hydrocarbons. The electrical signals from the sensor can additionally be processed to monitor stress and/or temperature changes as they alter the properties of the polymer. Other known sensors include conductive materials incorporated into polymers. Typically, these polymers swell with hydrocarbon adsorption, resulting in a subsequent change in the electrical conductivity of the material. However, these known sensors are fabricated from swellable polymers that are reusable. Reusing sensing films is not desirable since after a leak detection, the sensor must be removed from the site of the leak, and the adsorbate must be expunged from the pores of the adsorbent prior to reuse. With successive swelling and shrinking cycles, it has been shown in some cases, that the swelling potential and pressure of polymers decline after even the first cycle. This alteration of the sensing film properties may significantly affect the sensitivity and accuracy of the sensing film. Replacing these sensing film after each use can be costly since the films are generally expensive. Accordingly, the films are generally reused multiple times.

SUMMARY

In accordance with an aspect of the invention, there is provided a method of manufacturing a film. The method involves dissolving a backbone material in a non-aqueous solvent to form a non-aqueous solution. In addition, the method involves adding the non-aqueous solution to an aqueous solution to form a liquid-liquid interface. Furthermore, the method involves injecting a particulate proximate to the liquid-liquid interface. The method also involves evaporating the non-aqueous solution to form a film containing the particulate.

The backbone material may include one or more of paraffin wax, polystyrene, polypropylene, polyethylene, and Nafion.

The particulate may include any one of carbon, metals, metal oxides, or composite materials.

The non-aqueous solvent may be one or more of toluene and hexane.

The aqueous solution may be one or more of water and a phosphate buffer.

In accordance with an aspect of the invention, there is provided a hydrophobic film. The hydrophobic film includes a backbone material forming a polymer, wherein the polymer is formed at a liquid-liquid interface between a non-aqueous solvent and an aqueous solution, wherein the backbone material is dissolved in the non-aqueous solvent to form a non-aqueous solution. Furthermore, the hydrophobic film includes a particulate distributed across the polymer, wherein the particulate is distributed by injection proximate to the liquid-liquid interface prior to evaporation of the non-aqueous solution.

The backbone material may include one or more of paraffin wax, polystyrene, polypropylene, polyethylene, and Nafion.

The particulate may include of any one of carbon, metals, metal oxides, or composite materials.

The non-aqueous solvent may be one or more of toluene and hexane.

The aqueous solution may be one or more of water and a phosphate buffer.

An aqueous side of the film may be tunable for wettability.

A wettability may be tunable via selection of the particulate.

In accordance with an aspect of the invention, there is provided a device for detecting hydrocarbons. The device includes a hydrophobic film soluble in a non-aqueous solvent. The device further includes a first electrode in electrical communication with the hydrophobic film. In addition, the device includes a second electrode in electrical communication with the hydrophobic film. Also, the device includes a conductive material supported by the hydrophobic film, wherein the conductive material is configured to conduct a current from the first electrode to the second electrode. Exposure of the hydrophobic film to the hydrocarbons causes a change in conductivity.

The conductive material may include conductive nanoparticles embedded in the hydrophobic film.

The conductive nanoparticles may be carbon black.

The change in conductivity may result in a failure.

The failure may be a result of a crack in the hydrophobic film.

The failure may be a result of a rearrangement of the conductive material.

In accordance with an aspect of the invention, there is provided a method of detecting hydrocarbons. The method involves connecting a first electrode to a hydrophobic film soluble in a non-aqueous solvent, wherein the hydrophobic film includes a conductive material supported by the hydrophobic film, wherein the conductive material provides electrically conductivity to the hydrophobic film. In addition, the method involves connecting a second electrode to the hydrophobic film, wherein the hydrophobic film is electrically conductive such that the first electrode and the second electrode are in electrical communication. Furthermore, the method involves monitoring the conductivity of across the first electrode and the second electrode, wherein exposure of the hydrophobic film to the hydrocarbons causes a decrease in conductivity via a change in conductivity of the hydrophobic film.

The conductive material may include conductive nanoparticles embedded in the hydrophobic film.

The conductive nanoparticles may be carbon black.

The change in conductivity may result in a failure.

The failure may be a result of a crack in the hydrophobic film.

The failure may be a result of a rearrangement of the conductive material.

In accordance with an aspect of the invention, there is provided a device. The device includes a film tolerant of a variety of water-immiscible liquids, wherein the film is formed by: dissolving a backbone material in a non-aqueous solvent to form a non-aqueous solution, adding the non-aqueous solution to an aqueous solution to form an liquid-liquid interface, injecting a particulate proximate to the liquid-liquid interface, and evaporating the non-aqueous solution to form a film containing the particulate. The device also includes a magnetic material supported by the film, wherein the magnetic material is capable of manipulating the film.

The magnetic material may include magnetic nanoparticles embedded in the film.

The magnetic nanoparticles may be magnetite (Fe3O4).

The film may separate an immiscible liquid from water.

The film may separate oil from water.

The film may be to transport the oil to a collection device via a magnetic field.

BRIEF DESCRIPTION OF THE DRAWINGS

Reference will now be made, by way of example only, to the accompanying drawings in which.

DETAILED DESCRIPTION OF THE EMBODIMENTS

A device and a method of manufacturing a device for detecting hydrocarbons is provided. In an aspect of the invention, the device is a single use, low-cost organic solvent sensor. The method of manufacturing is simple, and the materials are readily available. In an aspect of the invention, carbon nanomaterials may be self-assembled at a water/hexane interface, where the hexane phase contains dissolved paraffin wax. Upon the controlled evaporation of hexane, the paraffin wax precipitates, trapping the carbon nanoparticles at the surface in a paraffin wax backbone, realizing a carbon nanoparticle-decorated film. The film may be hydrophobic and highly electrically conductive. When exposed to hydrocarbons or a mixture of hydrocarbons such as from a pipeline leak, the conductive carbon network deteriorates from film failure and an increase in film resistivity is monitored. The rate of change in resistivity may be proportional to the concentration and composition of organic molecules in contact with the film.

Figure 1:
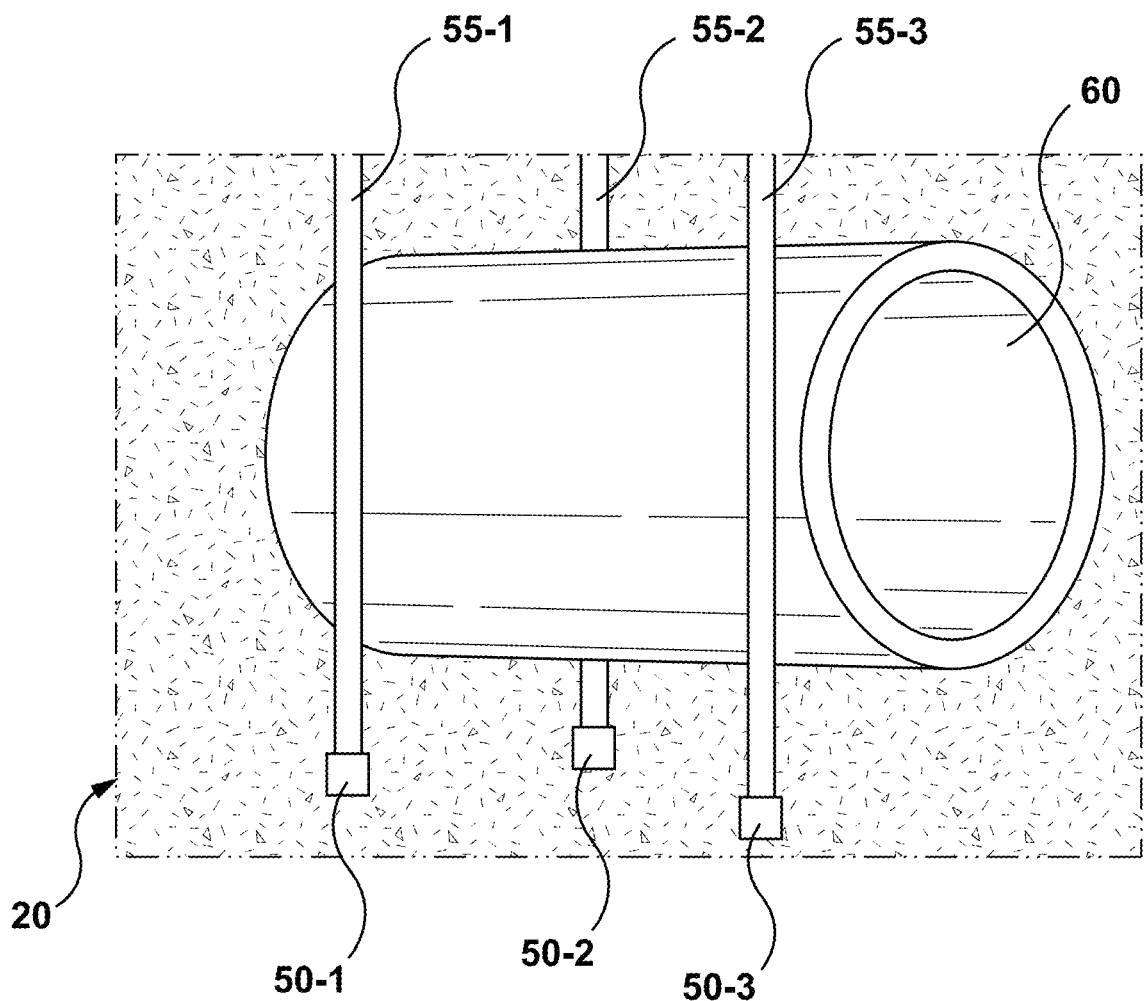
FIG. 1 is a schematic view showing an underground pipeline with devices arranged in an embodiment.

Referring to FIG. 1, a system 20 for detecting hydrocarbons is generally shown. In the present embodiment, the system 20 include a plurality of devices 50-1, 50-2, and 50-3 (generically, these devices are referred to herein as "device 50" and collectively they are referred to as "devices 50", this nomenclature is used elsewhere in this description). Each device 50 may be a single use, non-specific hydrocarbon sensor developed for the direct assessment and detection of hydrocarbon leaks from a pipeline 60. In the present embodiment, the devices 50-1, 50-2, and 50-3 are located at the end of rods 55-1, 55-2, and 55-3 inserted into the soil proximate the pipeline 60. As shown in FIG. 1, the rods 55 position the devices 50 close to the lower portion of the pipeline 60. In other embodiments, the device 50 can be attached to pipeline 60 during construction. In a further embodiment, each of the devices 50 may simply be placed in the ground and connected via a wired or wireless connection. It is to be appreciate by a person of skill in the art with the benefit of this description that each device 50 does not need to be in contact with the pipeline 60 and can be retrofitted into existing underground pre-existing pipelines 60 to be used. As discussed in greater detail below, the fabrication process of the device 50 is straightforward and cost-effective relative to other types of sensors. In the present embodiment, the device 50 uses materials derived from fossil fuels to detect hydrocarbons. For example, the device 50 may include a paraffin wax backbone with carbon nanoparticles distributed throughout the backbone material. However, it is to be appreciated that the device 50 is not particularly limited and that other materials can be used. For example, other backbone materials may include paraffin wax, polystyrene, polypropylene, polyethylene, Nafion, or any suitable polymer or ionomer.

Figure 2:
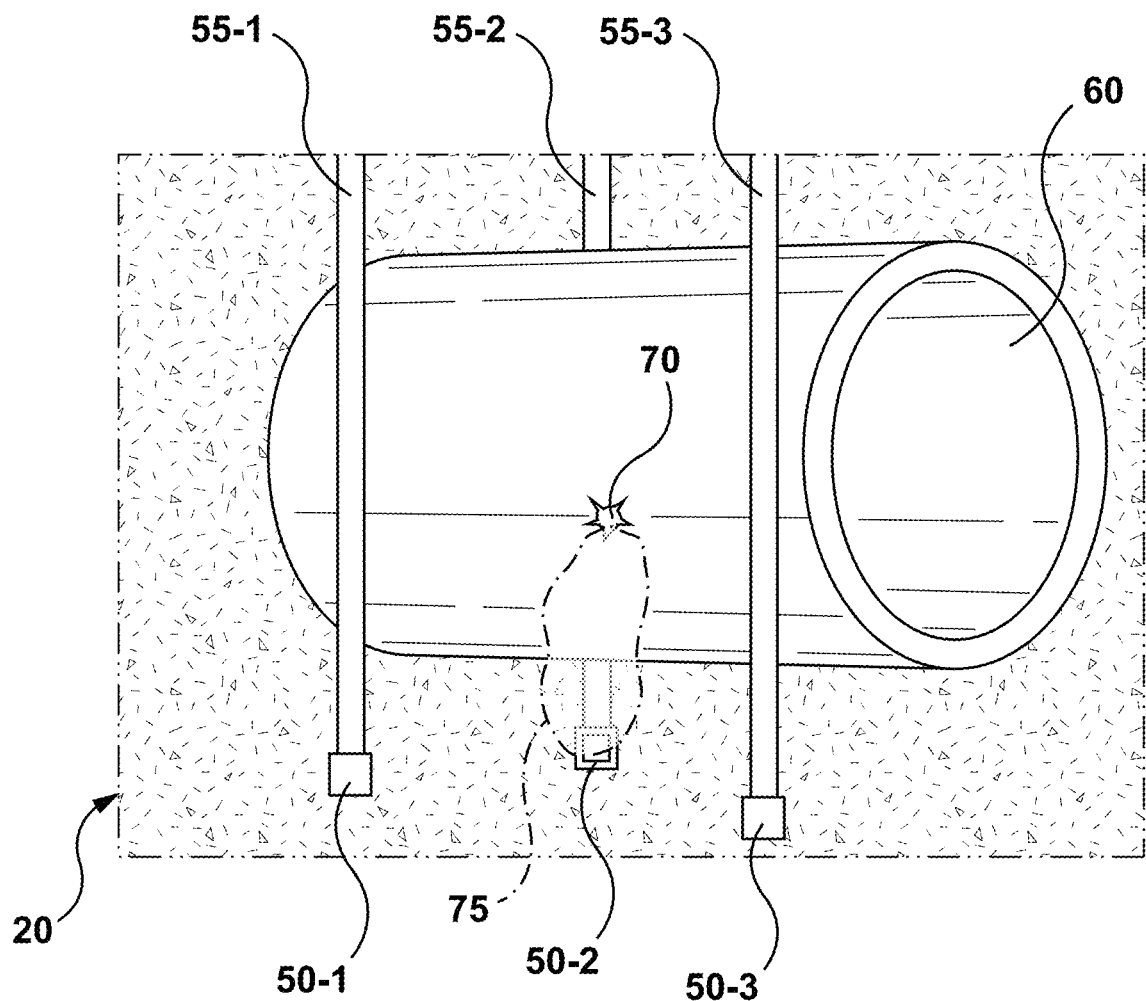
FIG. 2 is a schematic view showing a leak in the pipeline shown in FIG. 1.

In the present embodiment, the devices 50 are part of an underground sensor network which can be wired or wireless. The sensor network would provide a notification of a hydrocarbon leak 70. In the present embodiment, the leak 70 is a hole in the pipeline 60 developed as shown in FIG. 2, where pipeline content 75, such as oil or bitumen, leaks out of the pipeline 60 and into the environment. In the present embodiment, once the device 50-2 detects the presence of pipeline content 75, an alarm is triggered by the device 50-2 where corrective action, such as repairing or shutting down the pipeline may be taken. In the present example, the device 50-2 is triggered through an irreversible reaction, such as being dissolved by the pipeline contents and would need to be replaced on the pipeline 60 is repaired or replaced. In the present embodiment, the rod 55-2 can be removed from the ground to provide easy access to the device 50 for replacement.

It is to be appreciated that the devices 50 can detect small amounts of hydrocarbon, such as microliter quantities as described in greater detail below. It is to be appreciated with the benefit of this description that the magnitude of the response of the devices 50 can be directly correlated to the species of hydrocarbon in contact with the device 50. In addition, the device 50 can be manufactured from a hydrophobic material so that the device 50 does not respond to water, such as groundwater near the underground pipeline 60.

Figure 3:
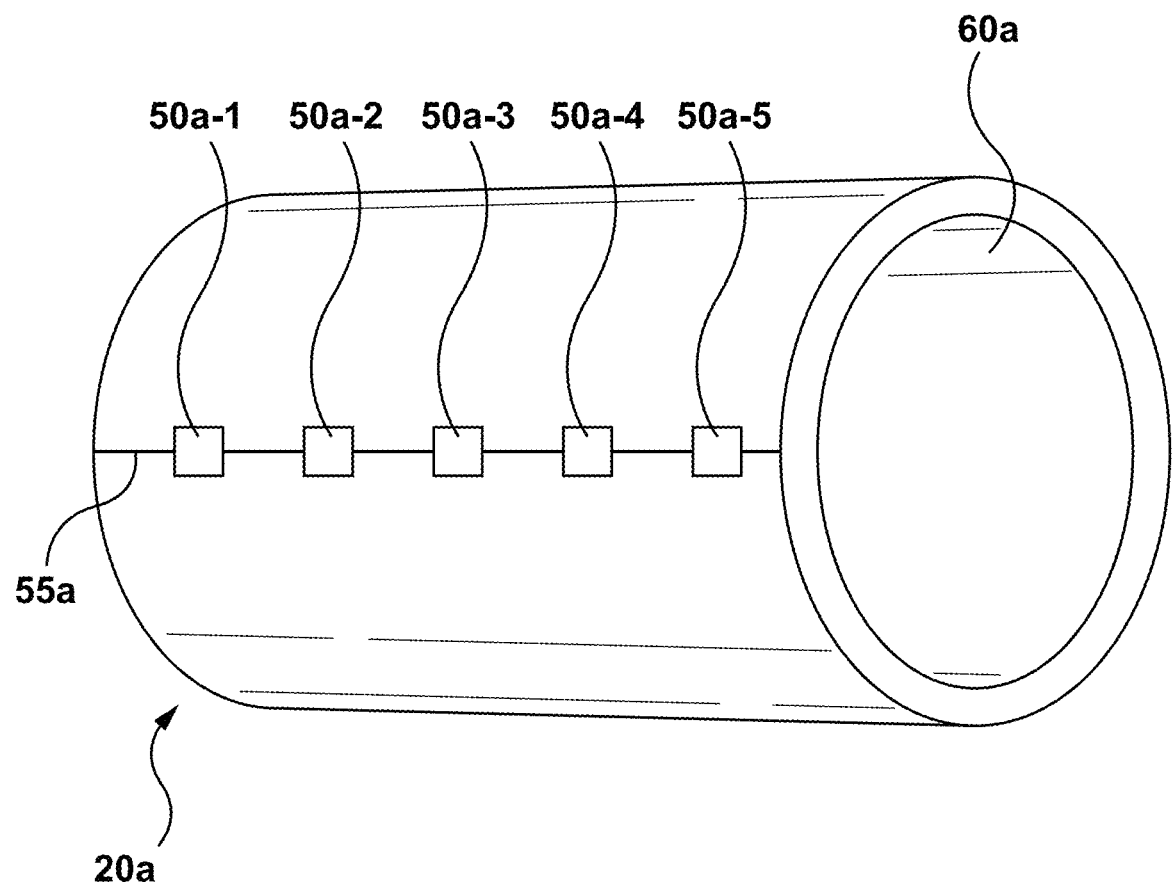
FIG. 3 is a schematic view showing a pipeline with devices arranged in another embodiment.
Figure 4:
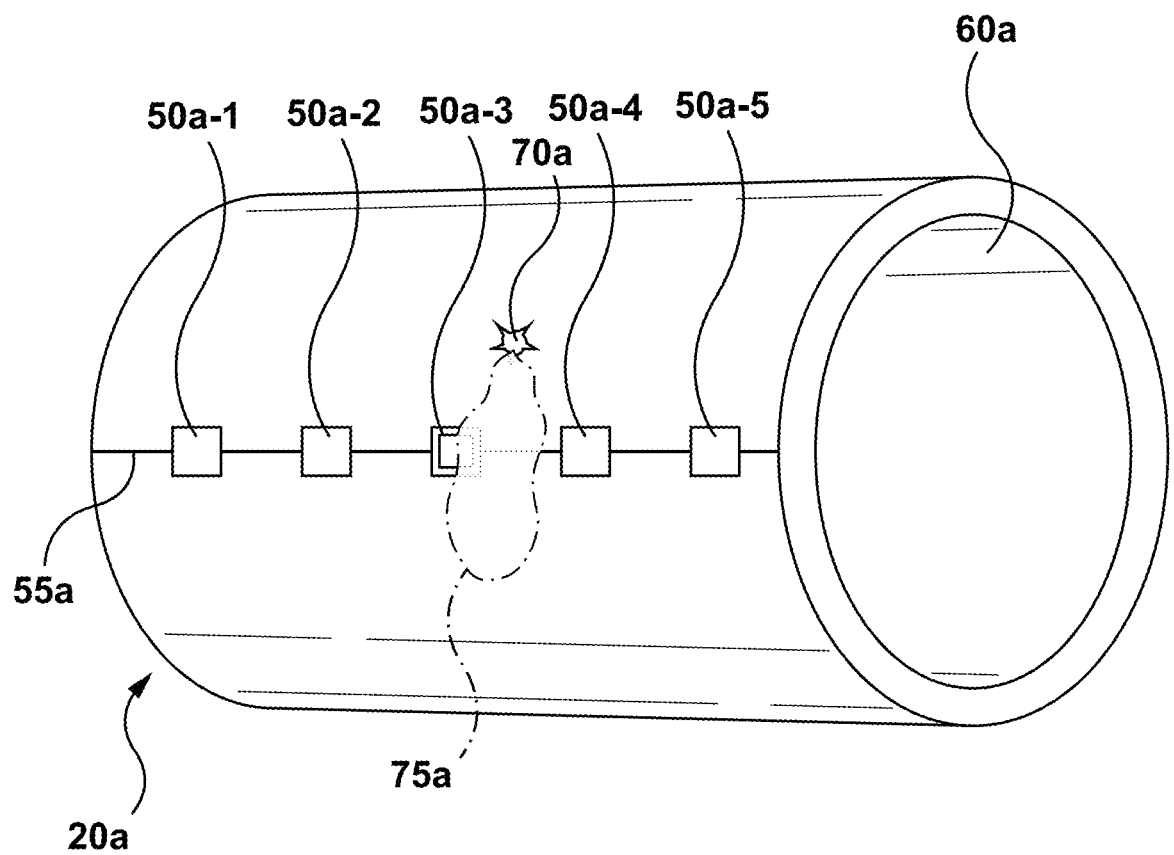
FIG. 4 is a schematic view showing a leak in the pipeline shown in FIG. 3.

Referring to FIGS. 3 and 4, another embodiment of a sensor network for detecting hydrocarbon leaks is generally shown at 20a. In the present embodiment, like components of the sensor network bear like reference to their counterparts in the sensor network shown in FIGS. 1 and 2, except followed by the suffix "a". In the present embodiment, an insulated electric line 55a may span the length of the pipe to allow for continuous monitoring. In this embodiment, the plurality of devices 50a-1, 50a-2, 50a-3, 50a-4, and 50a-5 are connected in line with the pipeline 60a. In the event of a leak, current across one or more of the devices 50a would be interrupted, triggering an automatic alarm as shown in FIG. 4. The manner by which the devices 50a are connected by the line 55a is not particularly limited. For example, each of the devices 50a may be connected in series. Accordingly, a failure or change in conductivity of any one device 50a would trigger an alarm for the entire line. In other examples, the devices 50a may be connected in parallel to each other such that the change in conductivity of a device 50a can be identified and located to provide addition information relating to where along the line the leak is occurring. Furthermore, it is to be appreciated that since the devices 50a are in contact with the pipeline 60a, the sensor network shown in FIGS. 3 and 4 can be applied to a pipeline 60a that is above-ground or underground. Although the devices 50a appear to be along the side of the pipeline 60a, it is to be appreciated that the devices 50a may be repositioned to other portions of the pipeline 60a or additional sensors may be place at other locations. For example, additional devices 50a may be placed at the bottom of the pipeline such that any leak, such as pipeline contents 75a from a leak 70a will be pulled download by gravity to one or more of the devices 50a.

Figure 5:
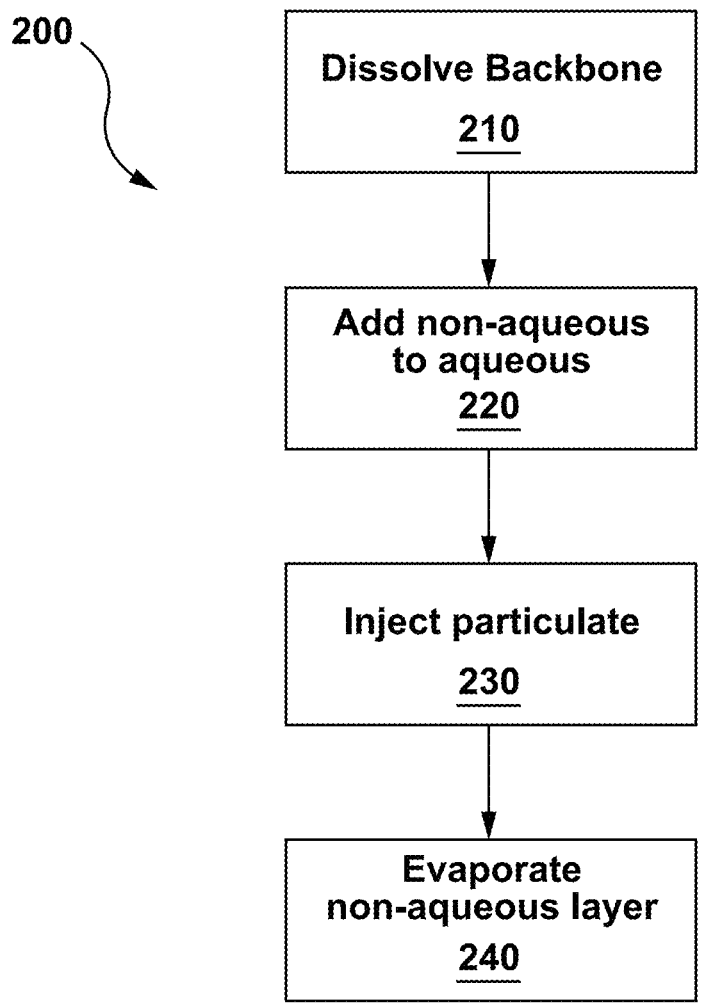
FIG. 5 is a flowchart of a method in accordance with an embodiment.

Referring to FIG. 5, a flowchart of manufacturing a hydrophobic film for use in the device 50 or 50a is shown at 200. The following discussion of method 200 may lead to a further understanding of device 50 or 50a and its advantages over other existing solutions used to monitor pipelines or other transportation and storage infrastructure for leaks of material containing hydrocarbons. It is to be emphasized, that method 200 need not be performed in the exact sequence as shown, and various blocks may be performed in parallel rather than in sequence, or in a different sequence altogether.

Beginning at block 210, a backbone material is dissolved into a non-aqueous solvent to form a non-aqueous solution. Then manner by which the backbone material is dissolved is not particularly limited and the backbone materials is also not particularly limited. As an example, the backbone material may be dissolved into in a single reaction vessel, such as a beaker or vat. In this present embodiment, paraffin wax is dissolved as the backbone material in a non-aqueous solvent, such as hexane at room temperature to form a non-aqueous solution. The non-aqueous solution may be dissolved in the reaction vessel, or it may be pre-made or dissolved in a separate vessel to be subsequently added to the reaction vessel. It is to be appreciated that the non-aqueous solvent is not particularly limited and may include other volatile solvents such as toluene, ethyl acetate, benzene, xylene, dichloromethane, dimethyl sulfoxide, or chloroform.

Block 220 involves adding the non-aqueous solution to an aqueous solution to form a liquid-liquid interface between the non-aqueous solution and the aqueous solution. In the present embodiment, the aqueous solution may be substituted with water. In other embodiments, the aqueous solution may be an acid, such as sulfuric acid or hydrochloric acid, salt solutions, such as brine, saline, potassium chloride, or sodium chloride, or a buffer solution such as a phosphate solution.

Block 230 involves injecting particulate proximate to the liquid-liquid interface between the non-aqueous solution and the aqueous solution. The manner by which the particulate is injected is not particularly limited. In the present example, the particulate is injected with a syringe near the liquid-liquid interface. In other examples, the particulate may be injected using a pipette or simply added to the reaction vessel and move through the non-aqueous layer to the liquid-liquid interface. For example, if the particulate was selected to have a buoyancy to be less than the non-aqueous layer and greater than the aqueous layer, the particulate will naturally move to the liquid-liquid interface. As another example, the particulate may simply be less buoyant than both the non-aqueous solution and the aqueous solution and pass through the liquid-liquid interface where it can react with the backbone material and become bound within the liquid-liquid interface. It is to be appreciated that in order to facilitate the injection the conductive material, the conductive material can may be suspended in a liquid, such as ethanol. In other examples, the particulate material may be directly added in powder form.

It is to be appreciated by a person of skill in the art with the benefit of this description that the particulate is not particularly limited and can be any material for use in a hydrophobic film. For example, the particulate may be a conductive material to provide an electrically conductive hydrophobic film. In particular, the conductive material may include carbon particulate matter, such as Vulcan carbon, carbon black, or any other conductive carbon particle material.

In other embodiments, the particulate may include magnetic nanoparticles, such as magnetite ($Fe_3O_4$). In such embodiments, the film can be used absorb or attached with immiscible liquids such as hydrocarbons, and oil from an oil leak, for transportation away from a hydrocarbon leak using a magnetic field. In particular, the film can be used to collect oil on a water surface. In this example, the hydrophobic film may be exposed to an oil/water emulsion such that a hydrophilic or oleophilic wax backbone interacts strongly with the oil droplets, resulting in the coagulation of the oil droplets around the film to form a single large oil droplet. The coagulated film can then be manipulated with a magnetic field from a permanent magnet or other source due to the magnetic particulate in the film. It is to be appreciated that some films may include both magnetic and conductive material.

Figure 6A:
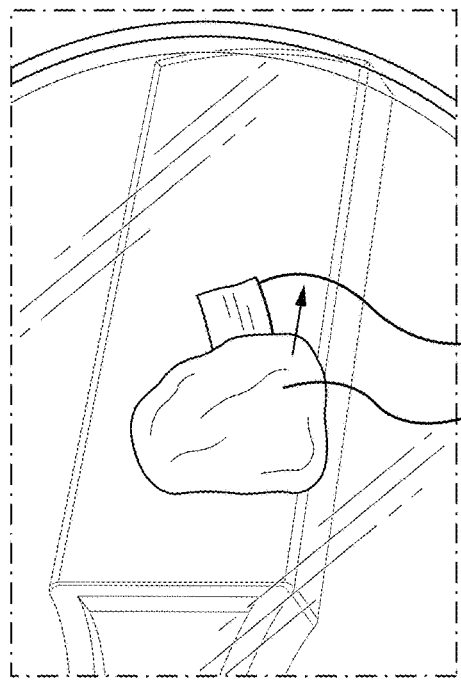
FIGS. 6a-c are views of an application of a film in accordance with an embodiment.
Figure 6B:
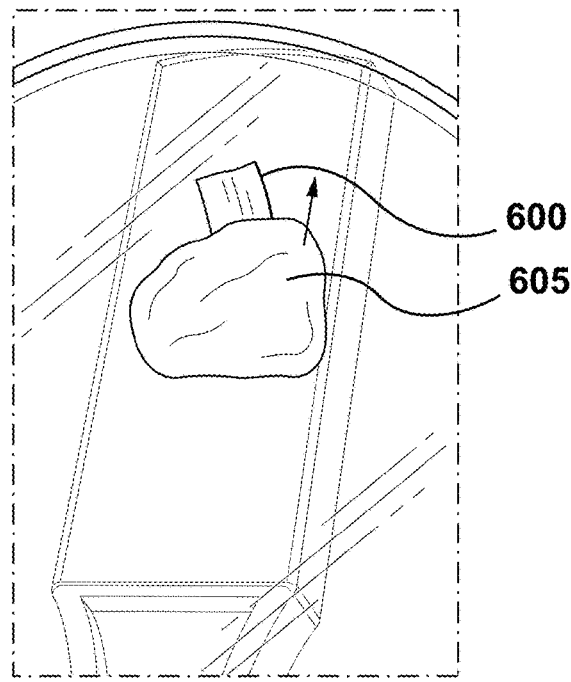
Figure 6C:
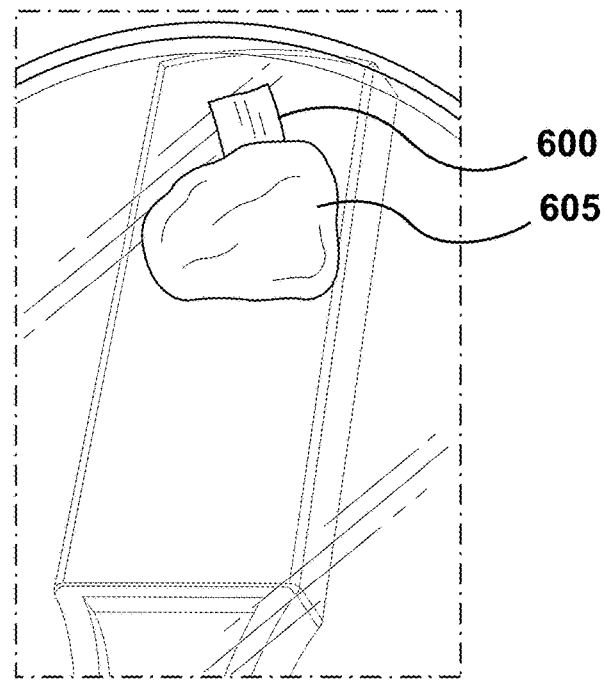

Referring to FIGS. 6a to 6c, an application of a hydrophobic film 600 with magnetic particulate embedded on a hydrophobic film is generally shown. As shown in FIG. 6a, the hydrophobic film 600 attracts non-aqueous material 605. In the present example, the interaction between the hydrophobic film 600 and the non-aqueous material 605 arises naturally from the chemical properties of the non-aqueous material 605 and the backbone material in the hydrophobic film 600. Accordingly, once the non-aqueous material 605 and the backbone material in the hydrophobic film 600 interact with each other, the hydrophobic film 600 may be moved with the application of a magnetic field, such as a magnet 610 to positions shown in FIG. 6b to drag the non-aqueous material 605 along the surface of the aqueous solution or water. Furthermore, as the non-aqueous material 605 comes into contact with additional non-aqueous material 615, the non-aqueous material 605 absorbs the additional non-aqueous material 615 to form a larger non-aqueous material 605' as shown in FIG. 6c.

In the embodiment, shown, the magnet 610 is placed underneath the water container. It is to be appreciated that the magnet 610 is not particularly limited and may be placed within the water, or may be suspended over the water container when it is not practical to place the magnet 610 into the water. For example, in an oil spill containment and collection operation, pieces of the hydrophobic film 600 may be distributed over a body of water, such as a pond or lake, that is contaminated so that the hydrophobic film 600 pieces may begin to bind with oil on the surface of the body of water. Magnets may then be suspended from barges or boats to move the hydrophobic film 600 pieces to a single location for collection using an appropriate collection device for the leaked immiscible liquid.

It is to be appreciated by a person of skill in the art with the benefit of this description that the non-aqueous material 605 and the backbone material in the film 600 may be selected for a specific application. For example, a paraffin backbone may be effective with gasoline, a polystyrene backbone may be effective with ethyl acetate, and a propylene backbone may be effective with toluene.

Returning back to FIG. 5, block 240 comprises evaporating the non-aqueous solution to form a hydrophobic film containing the particulate on top of the aqueous solution. In the present embodiment, the evaporation is a naturally occurring process. For example, the reaction vessel used to fabricate the hydrophobic film may be an open vessel, such that the non-aqueous solution can evaporate. The rate of evaporation is not particularly limited and can be aided by solvent selection, vessel design, vacuum pressure, and the application of heat. In one example, the vessel remains at room temperature and the rate evaporation may be about 20 µL/hour.

In other embodiments, it is to be appreciated that the evaporation rate can be controlled with different vessel designs and the application of heat in a controlled manner. With the evaporation of solvent from the non-aqueous solution, the backbone material precipitates to form a hydrophobic film at the liquid-liquid interface. This process traps the particulate, such as carbon nanoparticles, that may self-assemble at the liquid-liquid interface along the surface to form a carbon-decorated film. In some embodiments, the process may be carried out under calm, quiescent conditions, so as not to create bubbles or cracks in the morphology of the hydrophobic film. The resulting hydrophobic film is robust and can be easily manipulated and isolated, such as with the use of tweezers. It is to be appreciated by a person of skill in the art with the benefit of this description that the surface area, thickness and shape of the film may be manipulated by adjusting the amount of materials used and the size of the reaction vessel. Furthermore, it is to be appreciated that the size and the shape of the film is not particularly limited. For example, in a present embodiment, the hydrophobic film may be up to about 7 cm in diameter. Once removed from the aqueous layer, the hydrophobic films may be stored and dried. It is to be appreciated with the benefit of this description that the drying process does not affect the morphology or conductivity of the films, and the films can be easily transferred to a water/air interface post-drying.

Further variations are contemplated. For example, although the present embodiment uses water in the reaction vessel, the water can be substituted with aqueous solutions, such as a phosphate buffer solution. In addition, it is to be appreciated that the conductive material is not particularly limited. As another example of a variation, the conductive material for the particulate may include Ir, Pt, Au, Fe, Pd, etc. or any other metal nanoparticle, Ir/IrOx nanoparticles, order mesoporous carbon, colloid imprinted carbon, carbon fibers, graphene, and single walled carbon nanotubes. Other examples may include composite materials such as CdSe and ZnS.

Furthermore, the manufacturing process is not particularly limited and that several variations are contemplated. For example, in the present embodiment, the non-aqueous solvent used is hexane. In other embodiments, the solvent can be modified to be diethyl ether or another non-aqueous solvent with suitable properties. As another example of a variation in the method of manufacture, the temperature at which the process is carried out can be higher than room temperature to aid evaporation. As yet another example of a variation, in the present embodiment, ethanol is used to inject the conductive material proximate to the oil-water interface. In other embodiments, another liquid with a density between water and the non-aqueous solvent to promote self-assemblage of the conductive material at the oil-water interface.

In the present embodiment, the hydrophobic film may be used in a device 50 or 50a which includes the, electrodes, and conductive material supported by the hydrophobic film. In the present embodiment, the conductive material is Vulcan carbon nanoparticle and the hydrophobic film is a paraffin film. The film is contacted via electrodes, such as gold wires, glued to each end of the carbon-decorated film having dimensions of about 1.0 cm×1.0 cm using a conductive silver epoxy. In other embodiments, spring-loaded gold coated brass pins pressed into the film about 1 cm apart. It is to be appreciated by a person of skill in the art that the dimensions of the devices 50 and 50a are not particularly limited and that the films can be larger or smaller depending on the specific application.

Figure 7A:
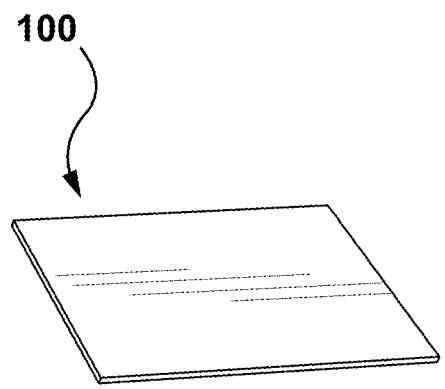
FIG. 7 is a schematic view showing (a) a film and failure by (b) rearrangement; and (c) fracture.
Figure 7B:
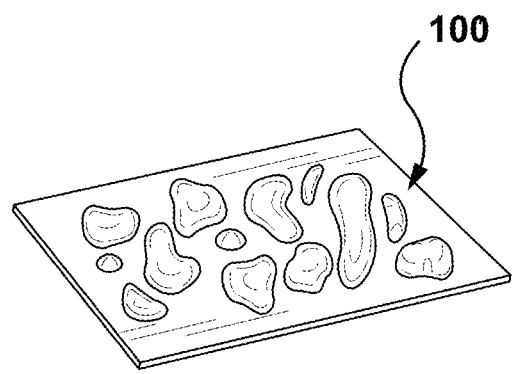
Figure 7C:
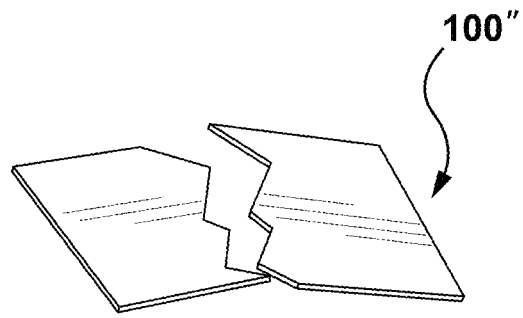

Referring to FIGS. 7a to 7c, the degradation of the hydrophobic film 100 used in the devices 50 and 50a is generally shown. In use, a potential can be applied across electrodes connected by a hydrophobic film 100 such that a current may pass through the device 50 or 50a via the hydrophobic film 100, which is made to be conductive by carbon decorating the film 100. For example, FIG. 7a shows a carbon-decorated film 100 after being fabricated such as by the method 200. Upon exposure to a hydrocarbon, such as hexane or other alkanes, alcohols, and aromatic compounds, the carbon-decorated film 100 degrades and fails to conduct current between the electrodes.

In particular, when the carbon-decorated film 100 is exposed to hydrocarbons, the film 100 may degrade in such a way that electrons can no longer be passed from one electrode to the other through the carbon-decorated film 100. As such, the current may rapidly decay to zero after exposure of hydrocarbons to the film 100. The mechanism of film "failure" in the presence of hydrocarbons can be by nanoparticle rearrangement to generate clusters 100' of nanoparticles that are no longer electrically conductive (FIG. 7a) or via fractures of the film 100 to generate film fragments 100" (FIG. 7b). In either of these two cases, the failure of the film 100 can be a consequence of hydrocarbon adsorption or absorption and the subsequent dissolution of the carbon-decorated film 100 (e.g. the paraffin wax backbone).

Figure 8A:
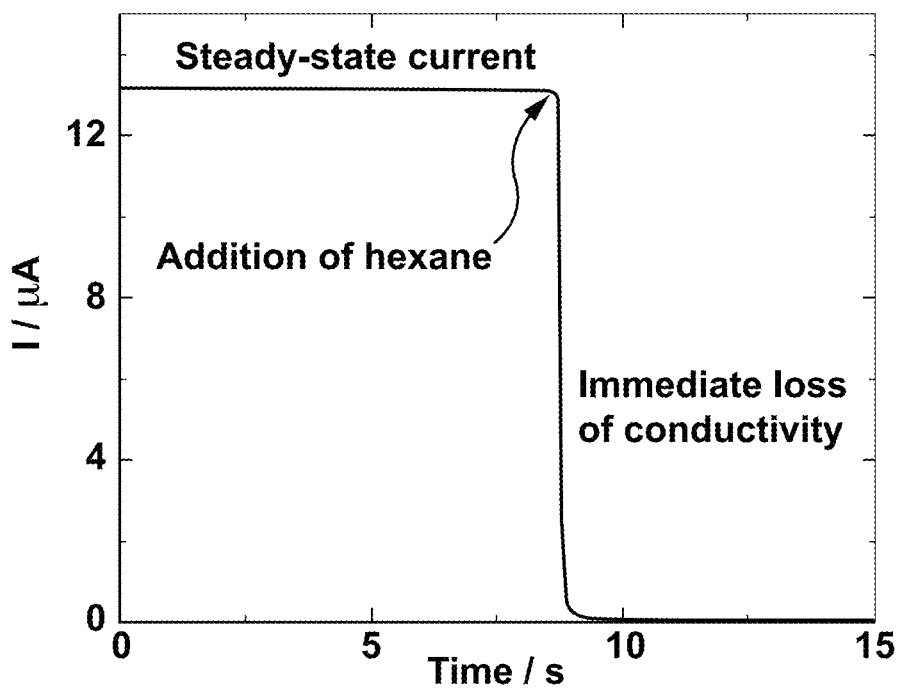
FIG. 8 is a chart showing (a) a response of the device with the addition of about 10 μL of hexane and (b) a response of the device with the addition of about 10 μL of water, hexane, octane, dodecane, hexadecane and paraffin oil.

As a specific example, in the present embodiment, the carbon-decorated film 100 has an average resistivity of the side fabricated facing water is approximately 2.0 k $\Omega$/cm. Continuing with this example, a fixed potential of about 100 mV can be applied laterally across the surface of the film. Referring to FIG. 8a, a corresponding, steady-state current is shown. Abruptly, following the addition of about 10 μL of hexane to the surface of the film, the current plummeted to about zero. The exposure to hexane resulted in the immediate failure of the film, thereby breaking the electrical circuit between the two electrodes.

Figure 8B:
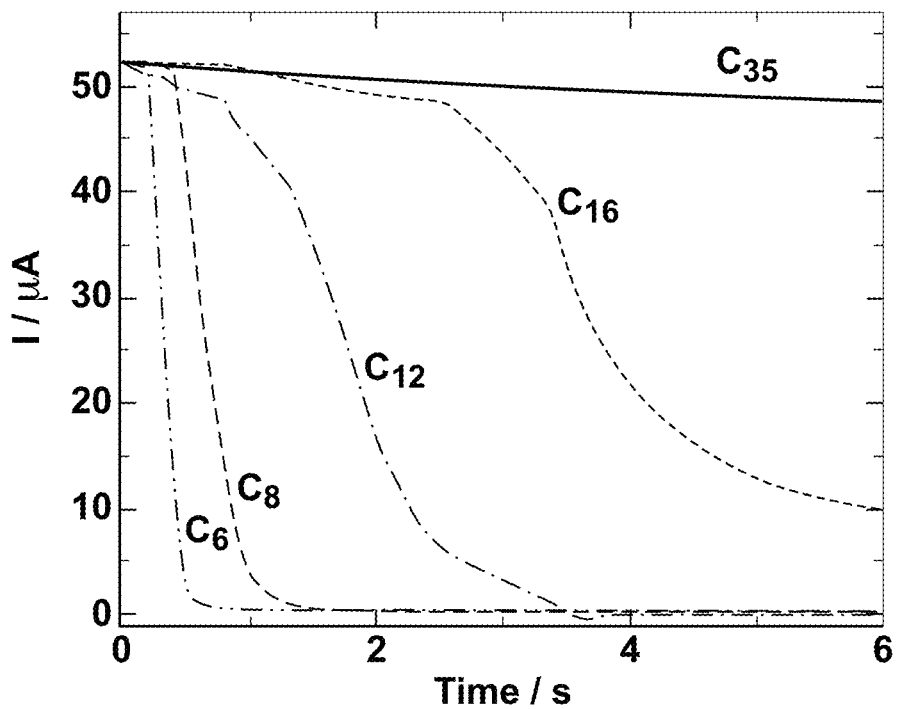

Referring to FIG. 8b, the loss of conductivity observed for films when exposed to alkanes of increasing molecular weights is shown. It is to be appreciated by a person skilled in the art with the benefit of this description that as the molecular weight of the compound increases, the drop-in conductivity decreases. Accordingly, this difference can be used to provide possible avenue for the identification of compounds causing the leak. It is to be appreciated that this feature would allow for determination of the identity of the leaking compound such that an appropriate response can be provided to correct the leak. In other embodiments, the device 50 or 50a can be used as an identification tool instead of as a leak detection tool.

Figure 9A:
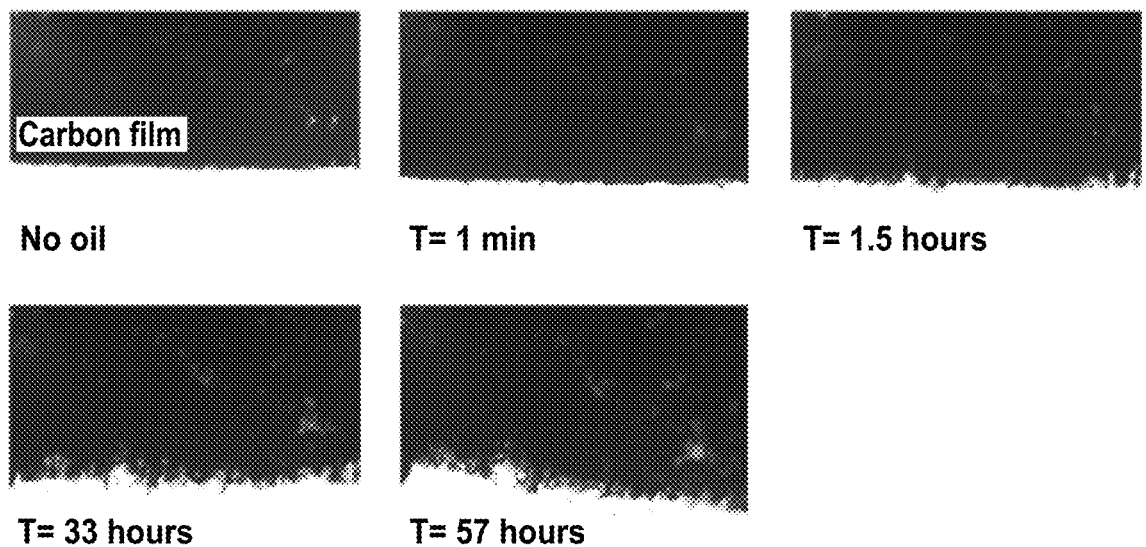
FIG. 9 is a magnified view showing a film failure from (a) paraffin oil and (b) dodecane.
Figure 9B:
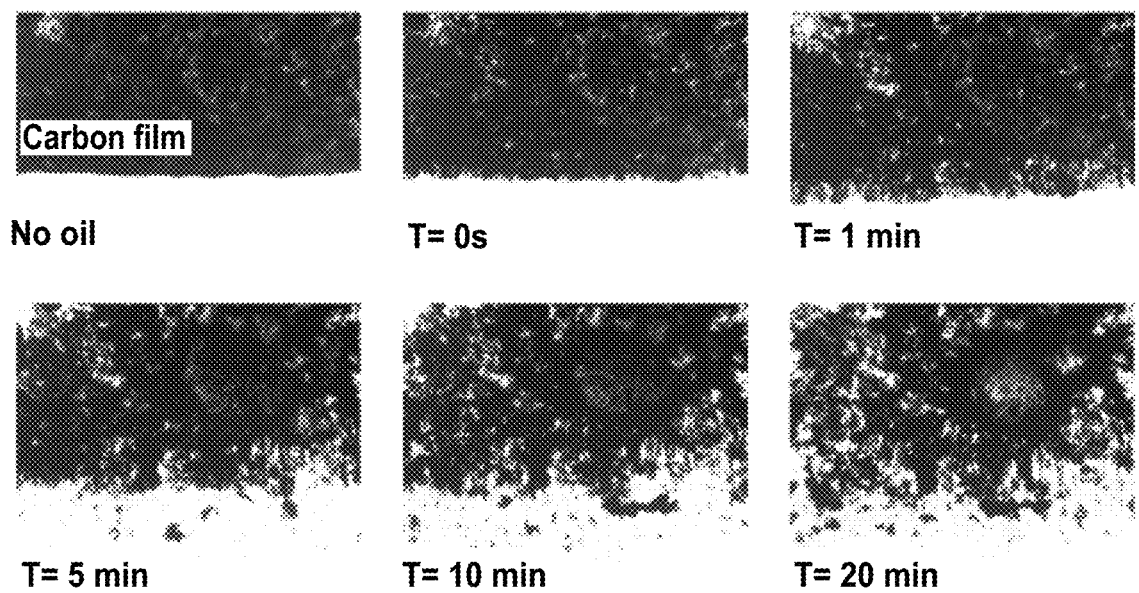

The mechanism of film failure can depend on the molecular weight and/or the viscosity of the hydrocarbon in which it is sensing. For example, when a high molecular weight compound, such as paraffin oil, can be deposited onto a carbon-decorated film. The carbon-decorated film is affected by the paraffin oil at a slower rate compared to that of a lower molecular weight compound such as dodecane (see FIGS. 9a and 9b, respectively). In these examples, the sorption of hydrocarbons at/into the wax backbone causes the film to become a viscous, gel-like substance.

Figure 10A:
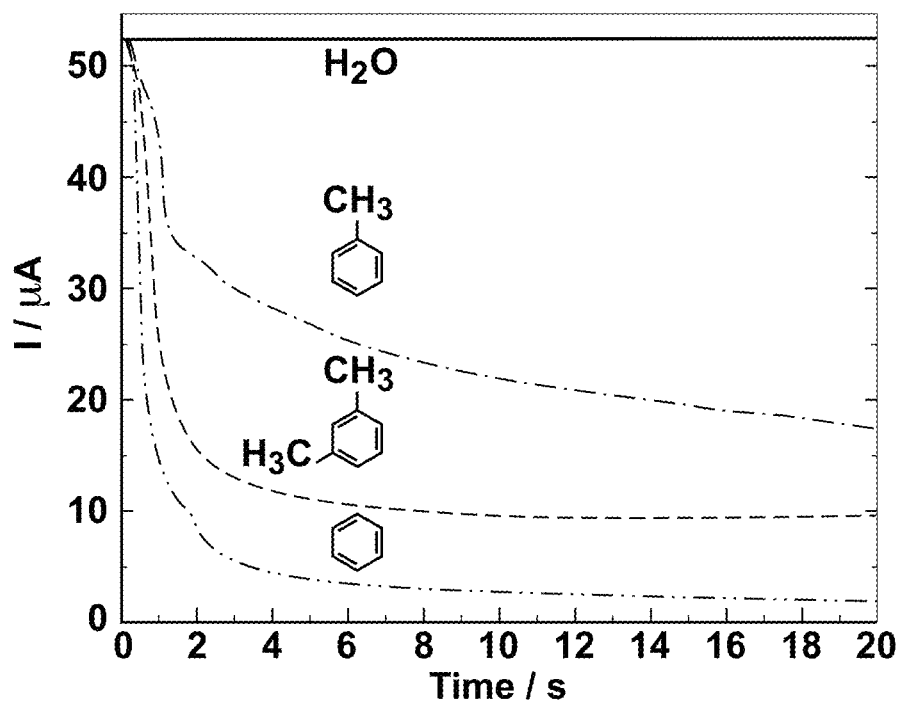
FIG. 10 is a chart showing (a) a response of the device with the addition of about 10 μL of water, xylene, benzene and toluene and (b) a response of the device with the addition of about 10 μL of water, pentanol, propanol and ethanol.
Figure 10B:
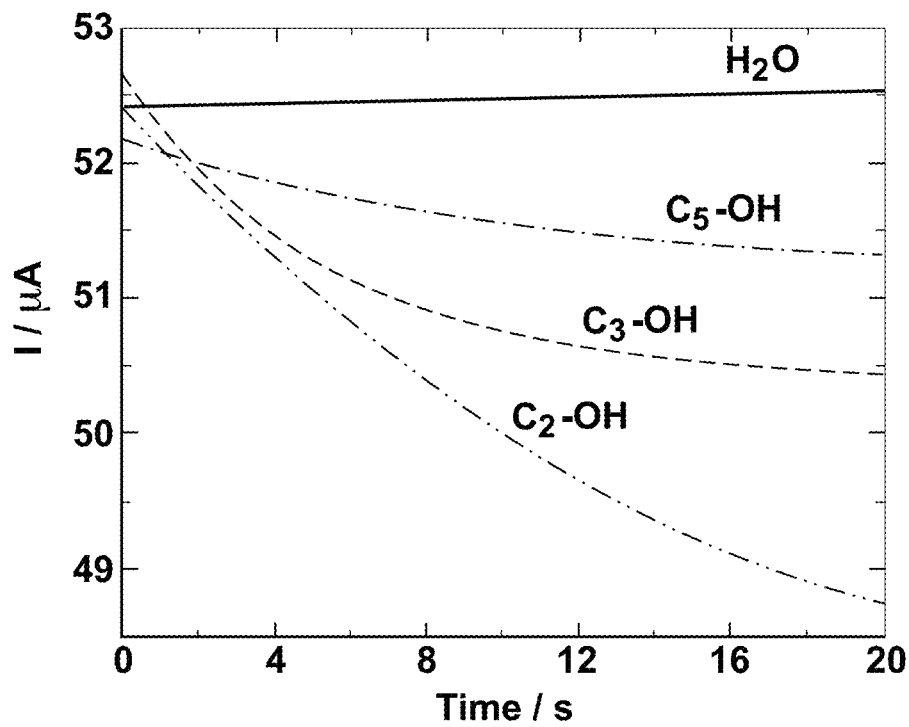

As mentioned above, it is to be appreciated that the response of the device 50 or 50a using the film 100 is not limited to alkanes. For example, more complex hydrocarbons (e.g., aromatics) can also trigger a response in the device 50 or 50a. Referring to FIG. 10a, the addition of xylene, benzene or toluene, three of the major components of the BTEX group of environmental pollutants, causes a significant decrease in the conductivity of the film. Accordingly, the same mechanism as the addition of alkanes described above could be expanded to include alkenes and alkynes. It is to be appreciated with the benefit of this description that the presence of functional groups on the hydrocarbon does not reduce the responsiveness of the device 50 or 50a, with pentanol, propanol and ethanol decreasing the current output from the film (see FIG. 10b). Similar to the trend observed for the alkanes, the largest response is achieved with smaller primary alcohols when compared with longer chain alcohols, though the rate of the current decrease appears to be slower than that of a corresponding alkane.

Figure 11A:
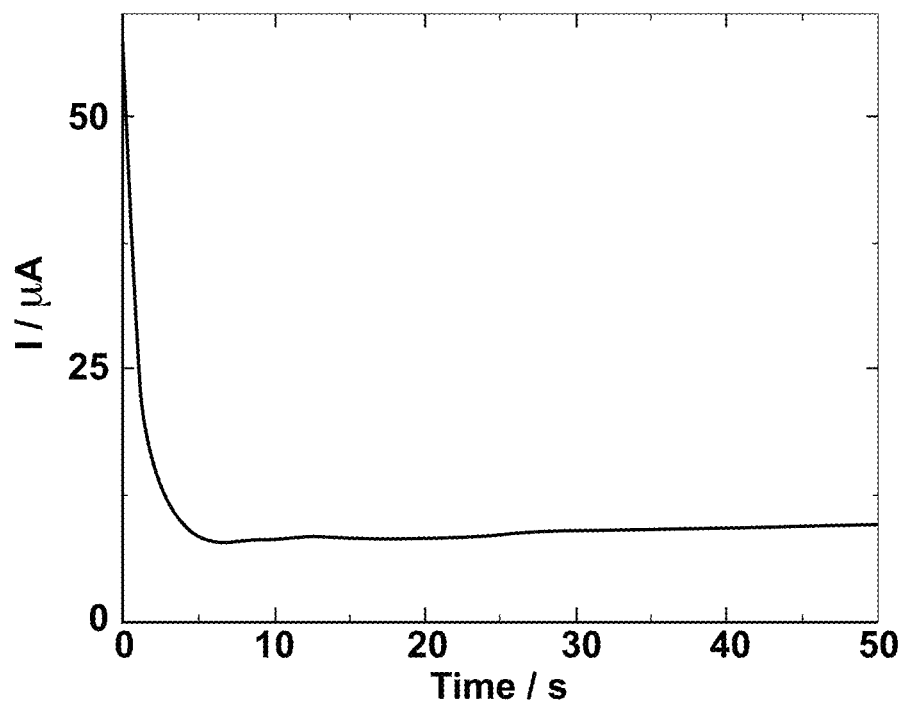
FIG. 11 is a chart showing (a) a response of the device with the addition of about 20 μL of gasoline directly to the surface of the sensing film and (b) a response of the device with the addition of about 500, about 100 and about 50 μl aliquots of gasoline to a sand pack situated on top of the sensing film.

As another example of an application of the device 50 or 50a, the device 50 or 50a can also respond to commercial-grade gasoline and can be used in a refinery. In general, gasoline is a mixture of hydrocarbons (C4-C12, including alkanes, alkenes, cycloalkanes, cycloalkenes and aromatics), blending agents and other additives (e.g. anti-oxidants and anti-knock agents). Gasoline can be added directly to the device 50 or 50a in the same manner as all previous chemical. As shown in FIG. 11a, the current decreased significantly but plateaued at a non-zero current. It is to be appreciated by a person of skill in the art with the benefit of this description, that some of the additives in the gasoline reacted at a gold coated pin, or that the film did not effusively interact with the gasoline due to the poor wettability of the gasoline additives with the film.

Figure 11B:
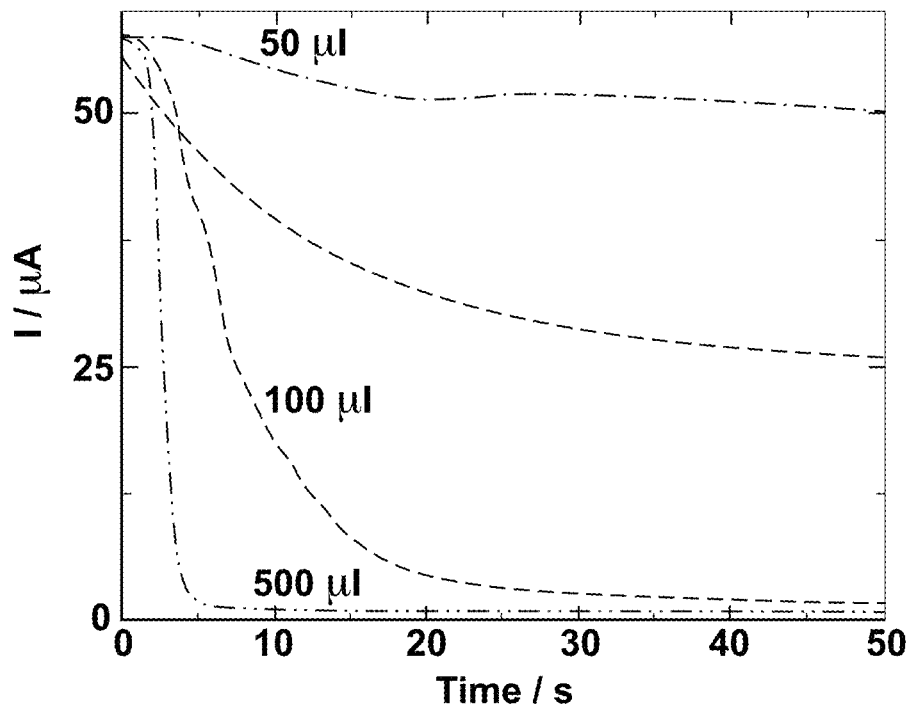

Continuing with the present example, an environmental spill or leak is simulated and the current response to different amounts of gasoline in a sand pack is shown in FIG. 11b. The inset of FIG. 11b depicts the setup used to test for the response to gasoline. The device 50 or 50a is held in place on a plastic plate by four spring-loaded gold coated brass pins, of which two opposite pins about 1 cm apart are subsequently connected to a potentiostat via wires. The upper and lower plastic plates are clamped together to ensure good connectivity between the spring-loaded pins and the sensing film. The film can be covered in a sand pack of about 6 cm$^3$ and gasoline can be deposited onto the top of the sand pack through a hole in the upper plate in 500 μl, about 100 μl and 50 μl aliquots, where it subsequently soaked through the sand to the underlying sensing film. A response is observed within about 10 seconds for all gasoline volumes, with the larger volumes of gasoline (500 μl and about 100 μl) resulting in faster signal responses. This is likely due to the smaller aliquots of gasoline being partially adsorbed by the sand pack before reaching the sensing film surface. In embodiments where gasoline is added to the sand pack as opposed to directly at the surface of the film, the response signal is greater because of the pressure exerted by the sand particles on the film, expediting film failure.

Various advantages will now be apparent to a person of skill in the art. Of note is a conductivity-based sensor for the presence of hydrocarbons in the event of a leak from an oil pipeline is provided herein. This sensor is both conductive and hydrophobic allowing it to be able to interact with a variety of organic molecules and perform as a sensor in various conditions where water and moisture can be present.

Figure 12A:
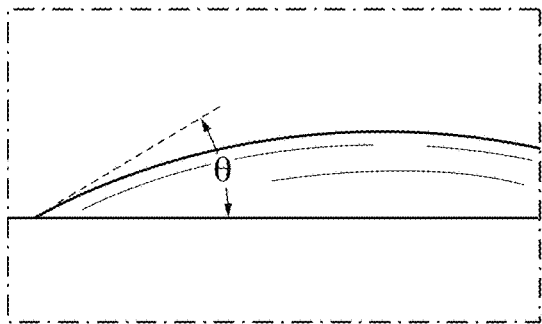
FIGS. 12a-f show various contact angle measurements.
Figure 12B:
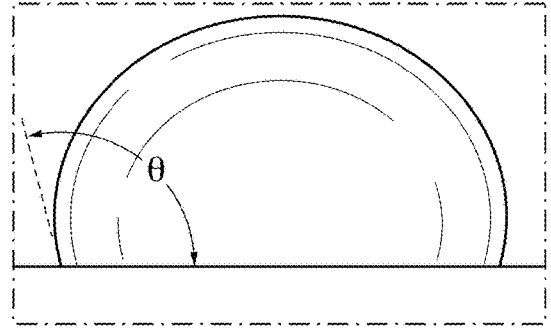
Figure 12C:
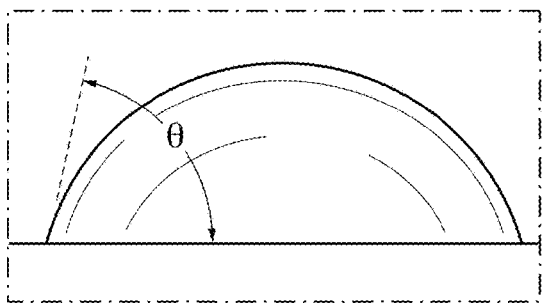
Figure 12D:
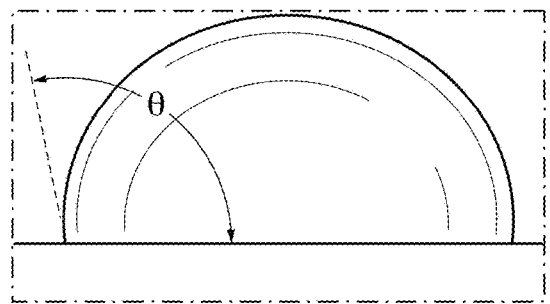
Figure 12E:
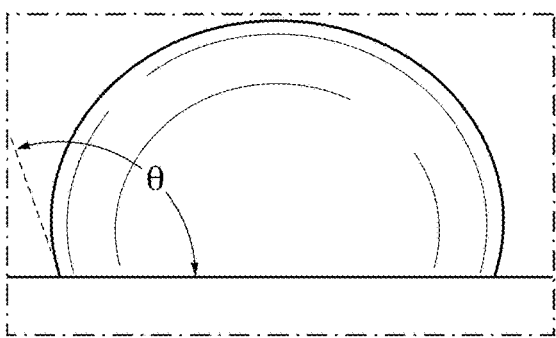
Figure 12F:
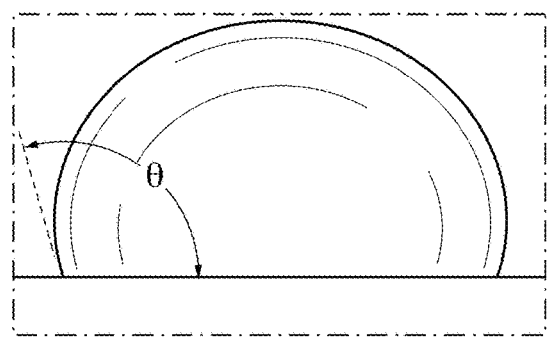

Another characteristic of the hydrophobic film is that the wettability of a surface of the hydrophobic film may be controlled by selecting the particulate to be embedded in the film. In particular, the side of the hydrophobic film that faced the aqueous solution can be varied. By contrast the side of the hydrophobic film that faced the non-aqueous solution remained substantially consistent regardless of the particulate which may suggest that the particulate is more concentrated on the aqueous side. For example, a contact angle of less than about 20 degrees (FIG. 12a) can be measured when Ira, nanoparticles are selected as the particulate. However, the contact angle on the side of the hydrophobic film that faced the non-aqueous side is about 103 degrees (FIG. 12b). By using $Fe_3O_4$ nanoparticles as the particulate, a contact angle of about 77 degrees can be measured on the side of the hydrophobic film that faced the aqueous solution and a contact angle of about 100 degrees on the hydrophobic film that faced the non-aqueous solution (although a the contact angle of 77 degrees suggest that the side of the film is hydrophilic, the opposite side of the file is hydrophobic and the film as a whole may continue to be referred to as the hydrophobic film). By using Vulcan Carbon nanoparticles as the particulate, a contact angle of about 109 degrees can be measured on the side of the hydrophobic film that faced the aqueous solution and a contact angle of about 108 degrees on the hydrophobic film that faced the non-aqueous solution. It is to be appreciated by a person of skill in the art with the benefit of this description that by controlling the wettability of a surface the film may be used to affect and control the flow of liquid through a pipe or over a surface. In addition, altering the wettability may be used to tune for the substances that the film may detect. For example, a more hydrophilic film may be used to detect the presence of water.

Figure 13A:
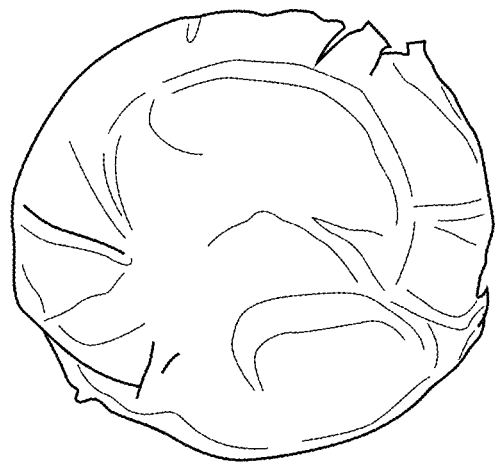
FIGS. 13a-g are views a film formed from various backbone materials.
Figure 13B:
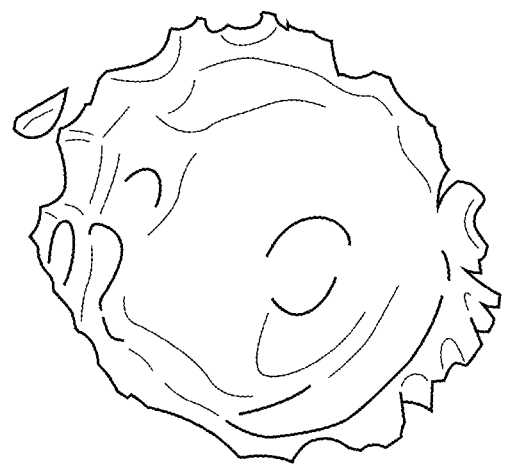
Figure 13C:
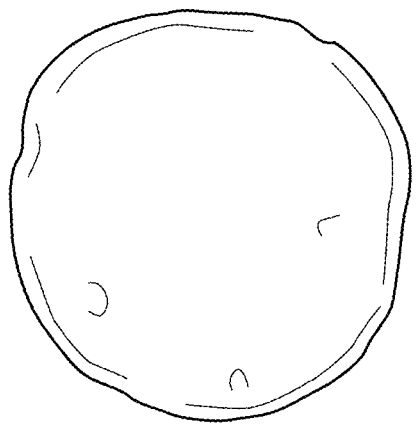
Figure 13D:
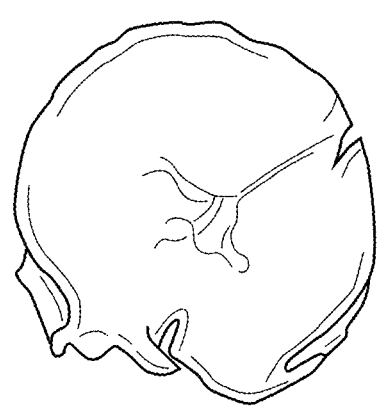
Figure 13E:
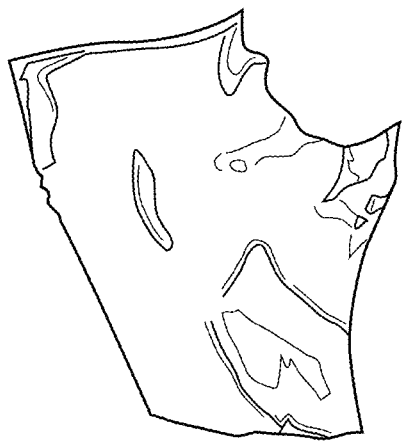
Figure 13F:
Figure 13G:
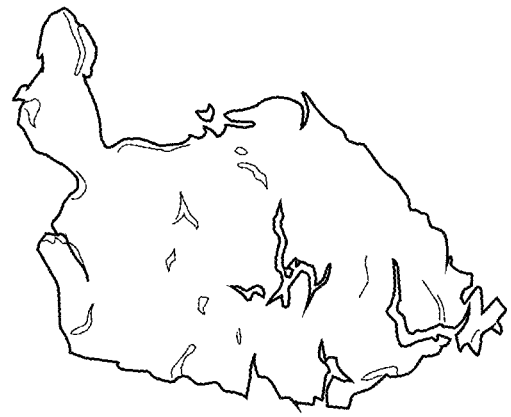

In addition to changing the particulate in the film, the backbone material may also be varied and substituted to change the physical characteristics of the film, such as the flexibility and melting points of the hydrophobic film. FIGS. 13a to 13g illustrate the use of different backbone materials with a consistent particulate, such as Vulcan carbon. FIG. 13a shows a film using a paraffin backbone material. FIG. 13b shows a film using a polystyrene backbone material. FIG. 13c shows a film using a polypropylene backbone material. FIG. 13d shows a film using a Nafion backbone material. FIG. 13e shows a film using a poly(methyl methacrylate) backbone material. FIG. 13f shows a film using a polyvidone backbone material. FIG. 13g shows a film using a polyvinyl alcohol backbone material. It is to be appreciated that each film described above in connection with FIG. 13 generally retains the properties of the original backbone. Accordingly, properties such as solubility to specific solvents may be tuned by selecting a backbone material.

It is to be appreciated that the device 50 or 50a is not limited to detecting leaks (gaseous or liquid leaks) from pipelines. Other potential applications can include water remediation, medical prognosis, and for use in industrial settings such as the detection of leaks around hydrocarbon storage tanks. For example, the device 50 or 50a can be used for underground storage tanks, such as gas stations, and for abandoned and operating industrial sites that used or manufactured solvents, and petrochemicals. In addition, the device can be used in the vicinity of wellheads of plugged and abandoned wells, surface facilities with a host of gathering lines.

While specific embodiments have been described and illustrated, such embodiments should be considered illustrative only and should not serve to limit the accompanying claims.

What is claimed is:

1. A method of manufacturing a film, the method comprising:
    dissolving a backbone material in a non-aqueous solvent to form a non-aqueous solution;
    adding the non-aqueous solution to an aqueous solution to form a liquid-liquid interface;
    injecting a particulate proximate to the liquid-liquid interface; and
    evaporating the non-aqueous solution to form a film containing the particulate at a surface of the aqueous solution;
    wherein the backbone material includes one or more of paraffin wax, polystyrene, polypropylene, polyethylene, and Nafion.

2. The method of claim 1, wherein the particulate comprises one or more of carbon, metals, metal oxides, and composite materials.

3. The method of claim 1, wherein the non-aqueous solvent is either toluene or hexane.

4. The method of claim 1, wherein the aqueous solution comprises a phosphate buffer.

5. A device comprising:
    a film tolerant of a variety of water-immiscible liquids, wherein the film is formed by:
        dissolving a backbone material in a non-aqueous solvent to form a non-aqueous solution;
        adding the non-aqueous solution to an aqueous solution to form a liquid-liquid interface;
        injecting a particulate proximate to the liquid-liquid interface; and
        evaporating the non-aqueous solution to form a film containing the particulate; and
    a magnetic material supported by the film, wherein the magnetic material is capable of manipulating the film.

6. The device of claim 5, wherein the magnetic material comprises magnetic nanoparticles embedded in the film.

7. The device of claim 6, wherein the magnetic nanoparticles are magnetite ($Fe_3O_4$).

8. The device of claim 5, wherein the film can separate an immiscible liquid from water.

9. The device of claim 5, wherein the film can separate oil from water.

10. The device of claim 9, wherein the film is to transport the oil to a collection device via a magnetic field.

11. A method of manufacturing a film, the method comprising:
    dissolving a backbone material in a non-aqueous solvent to form a non-aqueous solution;
    adding the non-aqueous solution to an aqueous solution to form a liquid-liquid interface;
    injecting a particulate proximate to the liquid-liquid interface; and
    evaporating the non-aqueous solution to form a film containing the particulate at a surface of the aqueous solution;
    wherein the particulate comprises one or more of carbon, metals, metal oxides, and composite materials.

12. The method of claim 11, wherein the non-aqueous solvent is either toluene or hexane.

13. The method of claim 11, wherein the aqueous solution comprises a phosphate buffer.

14. A method of manufacturing a film, the method comprising:
    dissolving a backbone material in a non-aqueous solvent to form a non-aqueous solution;

adding the non-aqueous solution to an aqueous solution to form a liquid-liquid interface;
injecting a particulate proximate to the liquid-liquid interface; and
evaporating the non-aqueous solution to form a film containing the particulate at a surface of the aqueous solution;
wherein the aqueous solution comprises a phosphate buffer.

15. The method of claim 14, wherein the non-aqueous solvent is either toluene or hexane.

* * * * *